United States Patent
Lum et al.

(10) Patent No.: US 9,071,975 B2
(45) Date of Patent: Jun. 30, 2015

(54) RADIO-FREQUENCY POWER AMPLIFIER CIRCUITRY WITH LINEARITY OPTIMIZATION CAPABILITIES

(75) Inventors: Nicholas W. Lum, Santa Clara, CA (US); William J. Noellert, Mountain View, CA (US); Ronald W. Dimpflmaier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 936 days.

(21) Appl. No.: 13/227,953

(22) Filed: Sep. 8, 2011

(65) Prior Publication Data

US 2013/0065541 A1    Mar. 14, 2013

(51) Int. Cl.
*H04B 1/40* (2006.01)
*H04W 16/14* (2009.01)

(52) U.S. Cl.
CPC ............ *H04W 16/14* (2013.01); *Y02B 60/50* (2013.01)

(58) Field of Classification Search
CPC ..................................................... H04W 16/14
USPC .................................. 455/63.1, 77, 115, 127
See application file for complete search history.

(56) References Cited

U.S. PATENT DOCUMENTS

| | | | |
|---|---|---|---|
| 2002/0183024 A1* | 12/2002 | Yamaguchi | 455/127 |
| 2004/0263246 A1* | 12/2004 | Robinson et al. | 330/124 R |
| 2010/0029289 A1 | 2/2010 | Love et al. | |
| 2010/0128689 A1* | 5/2010 | Yoon et al. | 370/329 |
| 2010/0148745 A1* | 6/2010 | Kanou | 323/318 |
| 2010/0255868 A1 | 10/2010 | Lee et al. | |

OTHER PUBLICATIONS

Li et al. "LTE Power Amplifier Module Design: Challenges and Trends" Skyworks Solutions, Inc., 2010.
"RF Transmitting Transistor and Power Amplifier Fundamentals" Philips Semiconductors, Mar. 23, 1998.

* cited by examiner

*Primary Examiner* — Hsin-Chun Liao
(74) *Attorney, Agent, or Firm* — Treyz Law Group; Chih-Yun Wu; Michael H. Lyons (57) ABSTRACT

An electronic device may be located in a geographical cell that is served by a base station. The electronic device may communicate with the base station on a frequency band. The frequency band may be subject to adjacent band emissions requirements to help prevent interference with wireless devices that are operating in adjacent frequency bands. The adjacent band emission requirements may vary based on the frequency band used to communicate with the base station, the geographical cell, and/or the presence of public safety radios. To satisfy the adjacent band emissions requirements while minimizing power consumption, the electronic device may receive cell information from the base station and adjust power amplifier linearity based on the received information.

18 Claims, 7 Drawing Sheets

RADIO-FREQUENCY POWER AMPLIFIER CIRCUITRY WITH LINEARITY OPTIMIZATION CAPABILITIES

BACKGROUND

This invention relates generally to wireless communications circuitry, and more particularly, to ways in which to optimize wireless communications performance by adjusting linearity of power amplifiers.

Integrated circuits often have wireless communications circuitry that includes radio-frequency power amplifiers. Radio-frequency power amplifiers are used to amplify radio-frequency signals for wireless transmission in a desired frequency band (sometimes referred to as a frequency channel).

A wireless device with a radio-frequency power amplifier can communicate with a base station by transmitting wireless signals to the base station in a frequency band. The radio-frequency power amplifier is used to amplify the wireless signals to output levels suitable for communication with the base station.

The radio-frequency power amplifiers are subject to emissions requirements that limit the amount of wireless interference with adjacent frequency bands. A conventional radio-frequency power amplifier reduces output transmission power levels to satisfy the emissions requirements. Reducing output power in this way may undesirably disrupt communications between the radio-frequency power amplifiers and the base station (e.g., because output power levels in the frequency band used to communicate with the base station may also be reduced).

It would therefore be desirable to be able to provide improved wireless communications circuitry.

SUMMARY

Electronic devices may include wireless communications circuitry. The wireless communications circuitry may include storage and processing circuitry, radio-frequency input-output circuits, radio-frequency power amplifier circuitry, power supply circuitry, and other wireless circuits.

The radio-frequency input-output circuits may feed signals to the power amplifier circuitry. The power amplifier circuitry may amplify the signals prior to wireless transmission. The power amplifier circuitry may include one or more power amplifiers. The power amplifier circuitry may include biasing circuitry that provides an adjustable input bias current to the power amplifiers and DC-DC (direct-current to direct-current) converter circuitry that supplies an adjustable bias supply voltage to the power amplifiers. The power amplifier circuitry may include adjustable load circuitry that provides an adjustable impedance load at the output of power amplifiers. The power amplifier circuitry may include one or more power amplifiers that form multiple amplification paths. Each power amplifier may include one or more amplification stages that may be selectively enabled or disabled.

The electronic device may be located in a geographical region that is served by a corresponding base station. The wireless communications circuitry may communicate with the base station by transmitting radio-frequency signals in a frequency band. The frequency band may be subject to out-of-band band emissions requirements such as adjacent band emissions requirements that help prevent interference with wireless devices that are communicating in adjacent frequency bands. The out-of-band band emission requirements may vary based on the frequency band used to communicate with the base station, the geographical region, and/or the presence of devices communicating in adjacent frequency bands (e.g., the presence of public safety radios communicating in an adjacent frequency band). To satisfy the out-of-band band emissions requirements while minimizing power consumption, the electronic device may receive cell information from the base station that identifies current out-of-band emissions requirements and adjust the linearity of the power amplifier circuitry based on the received cell information.

Further features of the present invention, its nature and various advantages will be more apparent from the accompanying drawings and the following detailed description.

DETAILED DESCRIPTION

This relates generally to wireless communications, and more particularly, to wireless communications circuitry with power amplifier linearity adjustment capabilities.

Wireless electronic devices with linearity adjustment capabilities may be portable electronic devices such as laptop computers or small portable computers of the type that are sometimes referred to as ultraportables. Portable electronic devices may also be somewhat smaller devices. The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. Wireless electronic devices such as these may perform multiple functions. For example, a cellular telephone may include media player functionality and may have the ability to run games, email applications, web browsing applications, and other software.

Figure 1:
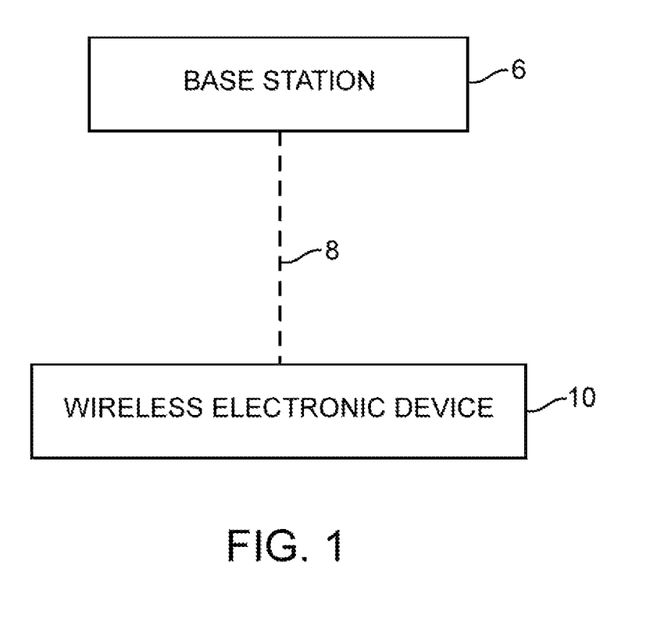
FIG. 1 is a diagram of an illustrative electronic device that may communicate with a base station in accordance with an embodiment of the present invention.

FIG. 1 shows a scenario in which a wireless electronic device 10 may communicate with a base station 6 over a wireless communications link 8. Wireless communications link 8 may be established by radio-frequency transmissions between base station 6 and wireless electronic device 10. Wireless communications link 8 may serve as a data connection over which wireless electronic device 10 may send and receive data from base station 6. For example, base station 6 may send control signals or data to wireless electronic device 10 via wireless communications link 8. The radio-frequency transmissions may be sent using cellular standards such as the 3GPP Long Term Evolution (LTE) protocol or other desired wireless standards.

Figure 2:
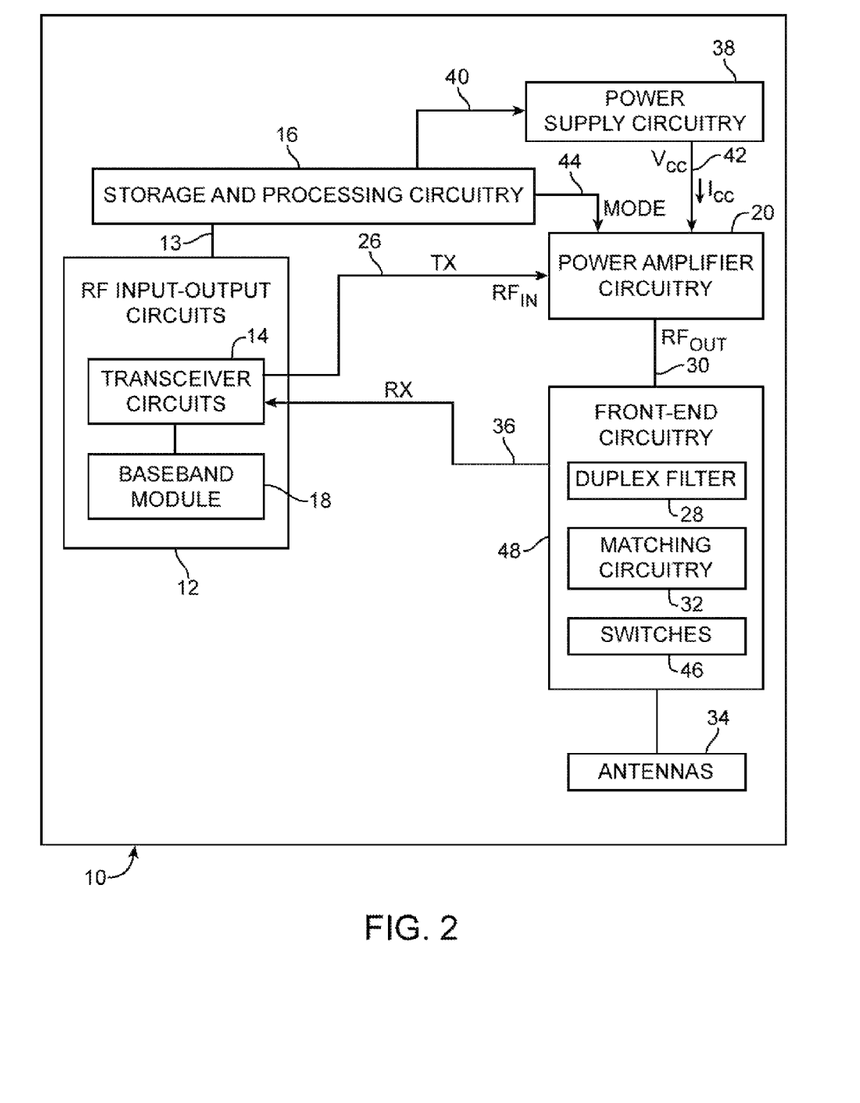
FIG. 2 is a diagram of an illustrative electronic device with wireless communications circuitry in accordance with an embodiment of the present invention.

FIG. 2 shows an illustrative wireless electronic device 10 that includes wireless communications circuitry. As shown in FIG. 2, device 10 may include one or more antennas such as antennas (antenna structures) 34 and may include radio-frequency (RF) input-output circuits 12. During signal transmission operations, circuitry 12 may supply radio-frequency signals that are transmitted by antennas 34. During signal reception operations, circuitry 12 may accept radio-frequency signals that have been received by antennas 34.

The antenna structures and wireless communications circuitry of device 10 may support communications over any suitable wireless communications bands. For example, the wireless communications circuitry may be used to cover communications frequency bands such as cellular telephone voice and data bands at 850 MHz, 900 MHz, 1800 MHz, 1900 MHz, and the communications band at 2100 MHz band, the Wi-Fi®(IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz. The wireless communications bands used by device 10 may include the so-called LTE (Long Term Evolution) bands. The LTE bands are numbered (e.g., 1, 2, 3, etc.) and are sometimes referred to as E-UTRA operating bands.

Device 10 can cover these communications bands and other suitable communications bands with proper configuration of the antenna structures in the wireless communications circuitry. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

Device 10 may include storage and processing circuitry such as storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 16 may be used in controlling the operation of device 10. Processing circuitry in circuitry 16 may be based on processors such as microprocessors, microcontrollers, digital signal processors, dedicated processing circuits, power management circuits, audio and video chips, radio-frequency transceiver processing circuits, radio-frequency integrated circuits of the type that are sometimes referred to as baseband modules, and other suitable integrated circuits.

Storage and processing circuitry 16 may be used in implementing suitable communications protocols. Communications protocols that may be implemented using storage and processing circuitry 16 include internet protocols, wireless local area network protocols (e.g., IEEE 802.11 protocols—sometimes referred to as Wi-Fi®), protocols for other short-range wireless communications links such as the Bluetooth® protocol, protocols for handling 2G cellular telephone communications services, 3 G communications protocols, 4 G communications protocols such as LTE, etc.

Data signals that are to be transmitted by device 10 may be provided to baseband module 18. Baseband module 18 may be implemented using a single integrated circuit (e.g., a baseband processor integrated circuit) or using multiple integrated circuits.

Baseband processor 18 may receive signals to be transmitted over antenna 34 over path 13 from storage and processing circuitry 16. Baseband processor 18 may provide signals that are to be transmitted to transmitter circuitry within RF transceiver circuitry 14. The transmitter circuitry may be coupled to radio-frequency power amplifier circuitry 20 via transmit path 26. Path 13 may also carry control signals from storage and processing circuitry 16. These control signals may be used to control the power of the radio-frequency signals that the transmitter circuitry within transceiver circuitry 14 supplies to the input of power amplifiers 20 via path 26. For example, the control signals may be provided to a variable gain amplifier located inside transceiver circuits 14 that controls the power of the radio-frequency signals supplied to the input of power amplifiers 20. This transmitted radio-frequency signal power level is sometimes referred to herein as Pin, because it represents the input power to power amplifier circuitry 20. The radio-frequency signals provided by input-output circuits 13 to power amplifier circuitry 20 may be referred to as RFin and the corresponding amplified radio-frequency output signals produced by power amplifier circuitry 20 may be referred to as RFout.

During data transmission, power amplifier circuitry 20 may boost the output power of transmitted signals to a sufficiently high level to ensure adequate signal transmission. Front-end circuitry 48 may include circuitry such as duplex filter 28, matching circuitry 32, switches 46, or other circuitry for interfacing between antennas 34 and power amplifier circuitry 20 or between antennas 34 and RF input-output circuits 12. Switches 46 may, if desired, be used to switch the wireless circuitry between a transmitting mode and a receiving mode. Duplex filter 28 (sometimes referred to as a duplexer) may be used to route signals received from antennas 34 to input-output circuits 13 and to route radio-frequency transmit signals from power amplifier circuitry 20 to antennas 34 based on the frequency of the signals.

Matching circuitry 32 may include a network of passive components such as resistors, inductors, and capacitors and ensures that antenna structures 34 are impedance matched to the rest of the wireless circuitry. Wireless signals that are received by antenna structures 34 may be passed to receiver circuitry in transceiver circuitry 14 over a receive path such as path 36.

Device 10 may include power supply circuitry such as power supply circuitry 38. Power supply circuitry 38 may provide a power supply voltage Vcc and a corresponding power supply current Icc to power amplifier circuitry 20. Power supply voltage Vcc may be provided by a battery or other desired power source.

Figure 3:
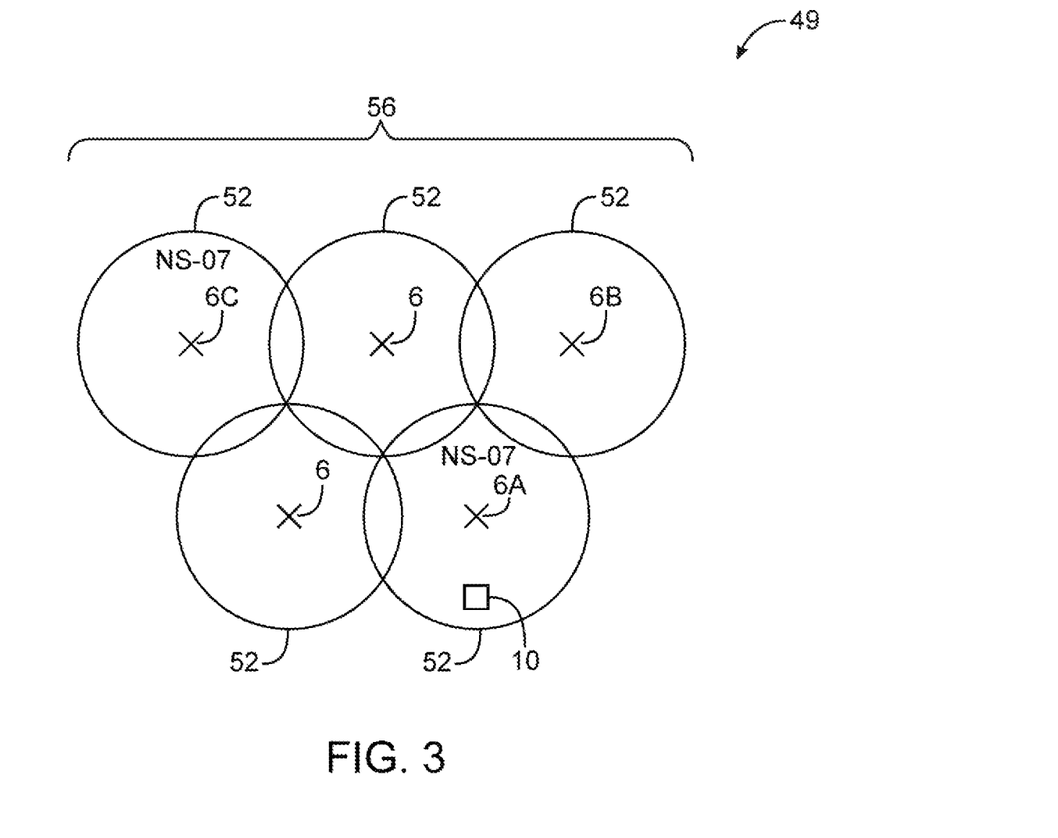
FIG. 3 is a diagram of an illustrative scenario in which an electronic device may be located in cells that are served by respective base stations in accordance with an embodiment of the present invention.

Wireless networks may include base stations arranged to provide wireless coverage over a geographical area (e.g., to allow electronic devices in the geographical area to communicate with the network via radio-frequency transmissions). The diagram of FIG. 3 illustrates a wireless network 49 that provides wireless coverage over geographical area 56. Geographical area 56 may include cells 52. Each cell 52 may include at least one base station 6 that provides access to network 49 (e.g., each base station 6 serves a corresponding cell 52). Wireless electronic devices (e.g., cellular wireless telephone devices) may wirelessly communicate with base stations 6 to access wireless network 49.

Each wireless electronic device may communicate with a base station 6 associated with the geographical location of the wireless electronic device (e.g., base station 6 that serves the cell in which the wireless electronic device is located). As shown in FIG. 3, device 10 may be located in a region 52 with an associated base station 6A that provides device 10 with access to network 49. Device 10 may move to various locations of geographical area 56 (e.g., device 10 may be a mobile wireless device). Depending on the geographical location of device 10, device 10 may communicate with different base stations 6. For example, device 10 may move from a first region covered by base station 6A to a second region covered by a second base station 6B.

Device 10 may communicate with an associated base station 6 on a frequency band (e.g., LTE band 9, 13, etc.). The available bandwidth of the frequency band may be partitioned into any desired number of resource blocks (e.g., frequency ranges within the frequency channel). For example, an LTE frequency band may be partitioned into 50 resource blocks that are allocated to wireless electronic devices by base station 6. In this scenario, wireless electronic device 10 may communicate with base station 6 by transmitting radio-frequency signals on the frequencies associated with resource blocks that are allocated to the wireless electronic device. The data rate at which device 10 may communicate with the base station may correspond to the number of resource blocks that have been allocated to device 10 (e.g., the bandwidth allocated to device 10).

Wireless electronic device 10 may be expected to transmit radio-frequency signals only in the frequency band used to communicate with base station 6. However, power amplifier circuitry 20 may undesirably produce radio-frequency signals on out-of-band frequencies (e.g., frequencies outside of the communications frequency band). For example, the output signal of power amplifier circuitry 20 may include intermodulation components at frequencies outside of the communications frequency band. The wireless emissions produced at frequencies outside of the communications frequency band may sometimes be referred to as spectral regrowth. The amount of wireless emissions produced at frequencies outside of the communications frequency band may depend on the linearity of power amplifier circuitry 20 (e.g., how linearly power amplifier circuitry 20 amplifies input signals).

The linearity of power amplifier circuitry 20 may be dependent on the supply voltage provided to the power amplifier. For example, if the supply voltage is too low, then the power amplifier may have insufficient headroom to linearly amplify input signals. In this scenario, input signals that are too large may result in amplified output voltages that are limited by the power supply voltage (sometimes referred to as gain compression). The gain of power amplifier circuitry 20 may therefore be dependent on the amplitude of the input voltage. In other words, the output signal of the amplifier may no longer linearly correspond to the input signal. Non-linear amplification by power amplifier circuitry 20 may produce spectral content on frequencies that are not present in the input signal.

Device 10 may be subject to emission requirements associated with limits on interference between the frequency band used by device 10 and other frequency bands (e.g., interference caused by out-of-band emissions produced by device 10). For example, adjacent band emissions requirements may limit the power level of emissions produced by the device in adjacent frequency bands. The emissions requirements may vary based on various factors such as the frequency band used by the device, the geographical area, or the presence of wireless devices connected to other networks (e.g., other networks that operate on frequencies close to the frequencies used by device 10 to communicate with base station 6).

For example, a device 10 that communicates with base station 6 on LTE band 13 (e.g., a frequency band that uses uplink frequencies 777 MHz-787 MHz and downlink frequencies 746 MHz-756 MHz) may produce wireless emissions that disrupt communication in a public safety network that communicates on a public safety band (e.g., frequencies 763 MHz-775 MHz). Because of the close proximity between the frequencies of LTE band 13 and the public safety band, adjacent band emissions requirements may be more restrictive than normal emissions requirements (e.g., such as the emissions requirements for other LTE bands). In this scenario, it may be desirable for device 10 to reduce adjacent band emissions in the public safety band by improving the linearity of power amplifier circuitry 20.

The out-of-band emissions requirement imposed on device 10 due to the presence of a public safety network may sometimes be referred to as NS-07 requirements. Each base station 6 of network 49 may identify whether wireless electronic devices that are connected to that base station must satisfy the NS-07 requirements. For example, base station 6A that provides network access to wireless device 10 may identify to wireless electronic device 10 that device 10 is located in an "NS-07 cell" (e.g., that device 10 is in a region with public safety devices that communicate in an adjacent public safety frequency band). In the example of FIG. 3, base stations 6A and 6C may serve a cell 52 that is an NS-07 cell.

Figure 4:
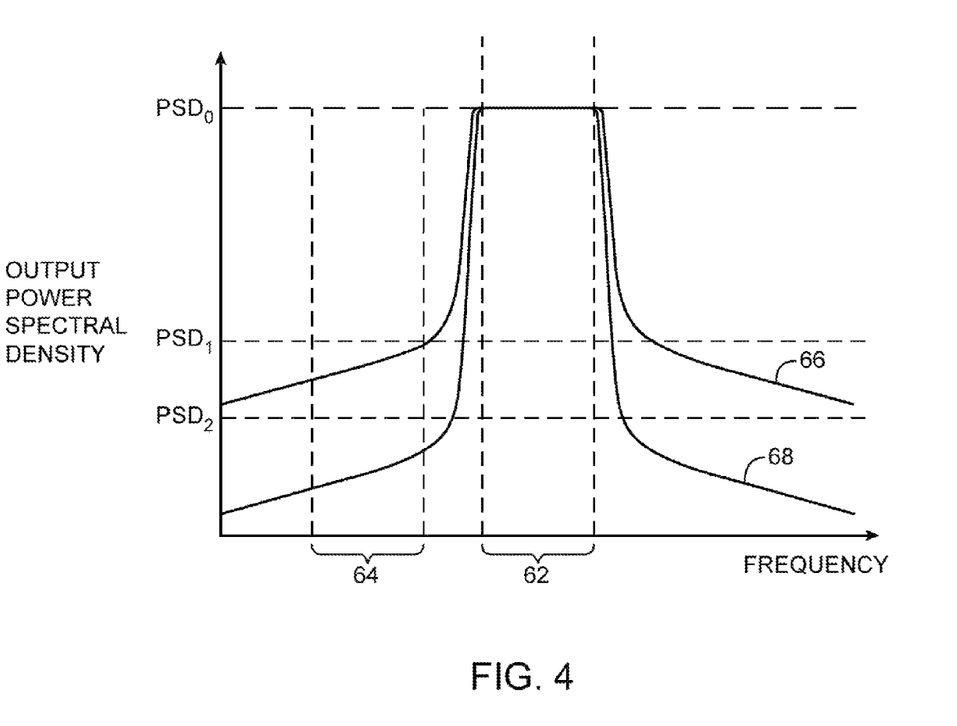
FIG. 4 is a graph showing how an electronic device may satisfy emissions requirements by adjusting power amplifier linearity in accordance with an embodiment of the present invention.

The graph of FIG. 4 shows how wireless electronic device 10 may adjust the linearity of power amplifier circuitry 20 to satisfy out-of-band emissions requirements (e.g., adjacent band emissions requirements) while maintaining a desired transmission output power. Curves 66 and 68 may represent the output power spectral density (e.g., power levels of wireless emissions per unit frequency) of power amplifier circuitry 20 in respective low and high linearity modes.

During normal operation, device 10 may be required to maintain power levels of emissions in an adjacent frequency band 64 that are below power spectral density PSD1. However, if adjacent frequency band 64 is identified as an NS-07 cell (e.g., if public safety radios are present or if base station 6 identifies that public safety radio devices are communicating in adjacent frequency band 64), then device 10 may be required to maintain adjacent band emissions below power spectral density PSD2. NS-07 requirements may be more restrictive than normal adjacent band emissions requirements. For example, PSD2 may be −57 dBm/6.25 kHz while PSD1 may be −35 dBm/6.25 kHz.

As shown by curve 66, power amplifier circuitry 20 may produce an output power spectral density PSD0 within transmission frequency band 62 (e.g., a range of frequencies used to communicate with base station 6) in the low linearity mode. In the low linearity mode, power amplifier circuitry 20 may produce power spectral density levels in adjacent frequency band 64 that satisfy normal emissions requirements but fail to satisfy NS-07 emissions requirements (e.g., the power spectral density values of curve 66 may lie between PSD1 and PSD2 in adjacent band 64).

As shown by curve 68, in the high linearity mode, power amplifier circuitry 20 may produce an output power spectral density PSD0 in transmission frequency band 62 while reducing adjacent band emissions. For example, wireless emissions in adjacent band 64 may be reduced to levels below PSD2, thereby satisfying normal emissions requirements and NS-07 emissions requirements.

The example of device 10 operating in the high linearity mode to satisfy NS-07 requirements is merely illustrative. If desired, device 10 may be operated in the high linearity mode to satisfy any desirable emissions requirements that are more restrictive than normal emissions requirements. For example, device 10 may be operated in the high linearity mode to satisfy any emissions requirements that are more restrictive than PSD1 (e.g., requirements that require output power spectral density in an adjacent frequency band to be less than −33 dBm/6.25 kHz).

Figure 5:
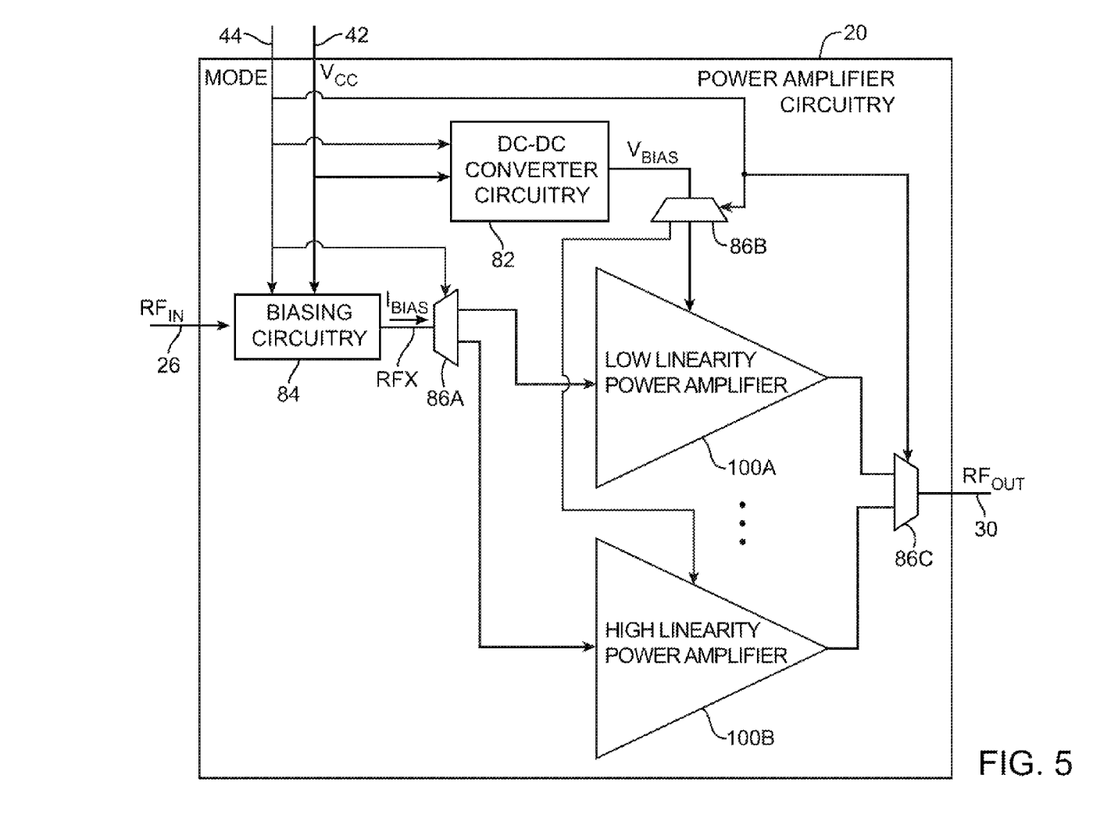
FIG. 5 is a schematic diagram of power amplifier circuitry in an electronic device in accordance with an embodiment of the present invention.

An illustrative diagram of power amplifier circuitry 20 with adjustable linearity is shown in FIG. 5. Power amplifier circuitry 20 may include DC-DC converter circuitry 82, biasing circuitry 84, power amplifiers 100A and 100B, and multiplexing circuits 86A, 86B, and 86C.

DC-DC converter circuitry may receive supply voltage Vcc via path 42 (e.g., from power supply circuitry 38) and mode control signals via path 44 (e.g., from storage and processing circuitry 16) and provide an output bias voltage Vbias to multiplexing circuit 86B. Vbias may be used as a power supply voltage for power amplifiers 100A and 100B. Bias voltage Vbias may be adjusted using the mode control signals to provide a desired bias voltage to power amplifiers 100A and 100B.

Biasing circuitry 84 may receive a radio-frequency input signal RFin via path 26 and the mode control signals via path 44 and produce an intermediate radio-frequency signal RFx with bias current Ibias. Bias current Ibias may be used to bias power amplifiers 100A and 100B. For example, current Ibias may be used to bias the base terminals of bipolar junction transistors in power amplifier 100A. Bias current Ibias may be adjusted using the mode control signals to provide a desired bias current to power amplifiers 100A and 100B.

Power amplifiers 100A and 100B may provide respective amplification paths for amplifying radio-frequency input signal RFin. Power amplifier 100A may be a low linearity power amplifier that conserves power and produces relatively high adjacent band emissions (e.g., adjacent band emissions that satisfy normal emissions requirements but do not satisfy NS-07 requirements). Power amplifier 100B may be a high linearity power amplifier that produces relatively low adjacent band emissions (e.g., that satisfy NS-07 requirements) at the cost of increased power consumption.

Mode control signals provided via path 44 may determine the operating mode of power amplifier circuitry 20. For example, the mode control signals may direct power amplifier circuitry 20 to in a low linearity mode or a high linearity mode.

In the normal mode, DC-DC converter circuitry 82 may produce a relatively low bias voltage, biasing circuitry 84 may produce a relatively low bias current, and multiplexing circuits 86A, 86B, and 86C may select the amplification path that includes low linearity power amplifier 100A. For example, the mode control signals may direct DC-DC converter circuitry 82 to produce a relatively low Vbias (e.g., less than 3.0 V), may direct biasing circuitry 84 to produce intermediate signal RFx with a relatively low Ibias, and may direct multiplexers 86A, 86B, and 86C to route the relatively low Vbias to power amplifier 100A and to route the intermediate signal RFx through power amplifier 100A to output path 30 (e.g., to select the amplification path that includes low linearity power amplifier 100A).

In the linear mode, DC-DC converter circuitry 82 may produce a relatively high bias voltage (e.g., more than 3.0 V), biasing circuitry 84 may produce a relatively high bias current, and multiplexing circuits 86A, 86B, and 86C may select the amplification path that includes high linearity power amplifier 100B. For example, the mode control signals may direct DC-DC converter circuitry 82 to produce a relatively high Vbias, may direct biasing circuitry 84 to produce intermediate signal RFx with a relatively high Ibias, and may direct multiplexers 86A, 86B, and 86C to route the relatively high Vbias to power amplifier 100B and to route intermediate signal RFx through power amplifier 100B to output path 30.

The example of FIG. 5 in which power amplifier circuitry 20 is provided with a low linearity amplification path and a high linearity amplification path is merely illustrative. If desired, power amplifier circuitry 20 may be provided with any number of amplification paths. For example, power amplifier circuitry 20 may be provided with a third amplification path optimized to satisfy a different set of emissions requirements while minimizing power consumption (e.g., a third amplification path that includes a medium linearity power amplifier that produces adjacent band emissions that are less than amplifier 100A but greater than amplifier 100B).

Figure 6:
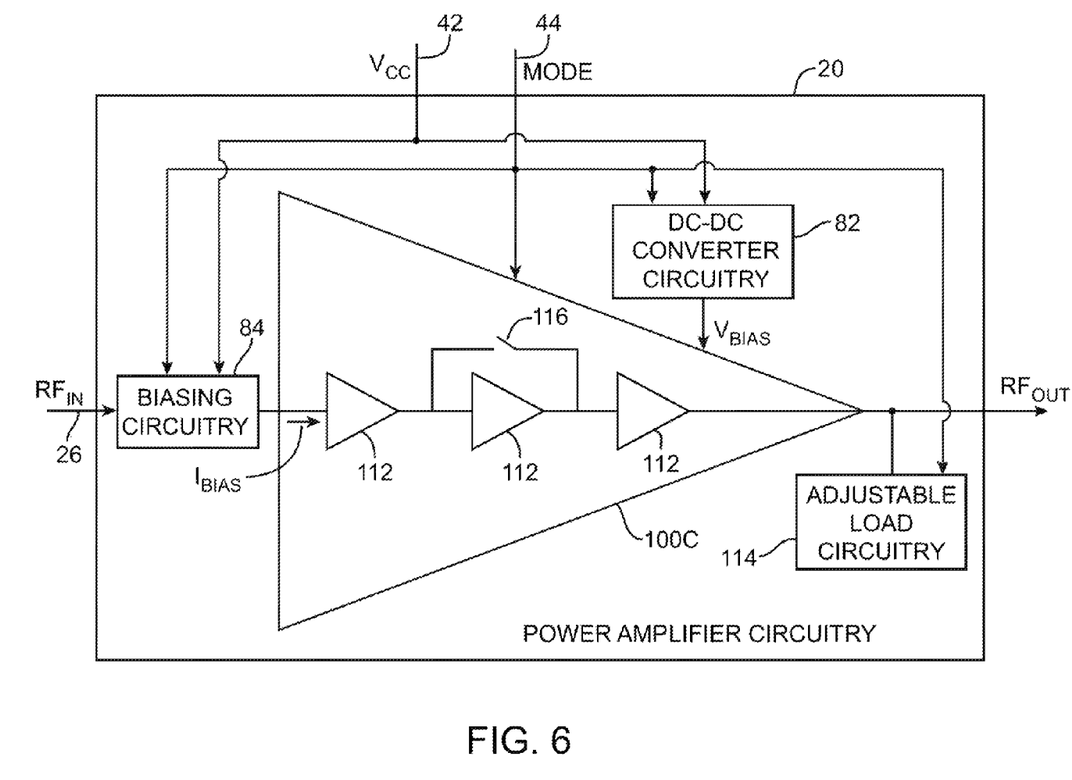
FIG. 6 is a schematic diagram of power amplifier circuitry with amplifier stage bypass capabilities and adjustable load circuitry in accordance with an embodiment of the present invention.

Each radio-frequency power amplifier (e.g., power amplifiers 100A and 100B in power amplifier circuitry 20) may include one or more power amplifier stages. Power amplifier circuitry 20 may be switched between linear and normal operating modes by bypassing one or more of the power amplifier stages. The example of FIG. 6 illustrates a scenario in which power amplifier circuitry 20 may be switched between a linear and a normal mode by bypassing one or more power amplifier stages 112 in a power amplifier 100C. Power amplifier circuitry 20 may include DC-DC converter circuitry 82 that provides an adjustable bias voltage Vbias to power amplifier 100C and biasing circuitry 84 that provides an adjustable bias current Ibias to power amplifier 100C.

As shown in FIG. 6, mode control signals provided via path 44 may be provided to power amplifier 100C. The mode control signals may direct power amplifier 100C to selectively enable and disable stages 112. To selectively enable a stage, the control signals may direct switch 116 to form a bypass path around a selected power amplifier stage 112. For example, in a normal mode, the mode control signals may close switch 116, forming a signal path for radio-frequency signals to bypass the second power amplifier stage 112 and disable the second power amplifier stage 112 (e.g., to conserve power). As another example, in a normal mode, the mode control signals may open switch 116 and enable the second power amplifier stage 112, allowing radio-frequency signals to pass through the second power amplifier stage 112 (e.g., to increase the linearity of power amplifier 100C). The example of bypassing a single stage is merely illustrative. If desired, any number of power amplifier stages may be bypassed by controlling switch 116 with the mode control signals. If desired, any number of switches 116 may be formed to bypass corresponding amplifier stages 112.

Power amplifier circuitry 20 may include adjustable load circuitry 114 coupled to the output of power amplifier 100C. Adjustable load circuitry 114 may provide an adjustable impedance at the output of amplifier 100C. By adjusting the impedance of circuitry 114 (e.g., using the mode control signals), the linearity of power amplifier circuitry 20 may be improved. For example, the voltage swing of a relatively large output signal may be limited by the available power amplifier supply voltage (e.g., the large output voltage of RFout may be clipped by supply voltage Vbias). In this scenario, the impedance of adjustable load circuitry 114 may be reduced to decrease the output voltage swing, thereby improving the linearity of power amplifier circuitry 20 (e.g., with a lower output impedance, amplifier 100C may produce an output signal that has a voltage swing that is small enough to prevent clipping).

The impedance of adjustable load circuitry 114 may be adjusted by switching between a high impedance load and a low impedance load (e.g., switching between two circuits with different characteristic impedances). If desired, adjustable load circuitry 114 may include a variable impedance load formed from any combination of transistors, resistors, capacitors, inductors, or other circuit elements.

As an example, to operate power amplifier circuitry 20 in a linear mode, mode control signals may be provided via path 44 that direct switch 116 to form a bypass path, biasing circuitry 84 to produce a relatively low bias current, DC-DC converter circuitry 82 to produce a relatively high bias supply voltage, and adjustable load circuitry 114 to provide a relatively low impedance to the output of power amplifier 100C. In this scenario, power amplifier circuitry 20 may reduce out-of-band wireless emissions and prevent interference with adjacent frequency bands such as public safety bands.

As another example, to operate power amplifier circuitry 20 in a normal mode, mode control signals may be provided that opens switch 116, directs biasing circuitry 84 to produce a relatively high bias current to amplifier 100C, directs DC-DC converter circuitry 82 to produce a relatively low bias supply voltage, and directs adjustable load circuitry 114 to provide a relatively high impedance to the output of power amplifier 100C. In this way, the efficiency of amplifier circuitry 20 may be optimized and power consumption may be minimized while ensuring that normal adjacent band emissions requirements are satisfied.

The example of adjustable load circuitry 114 located in power amplifier circuitry 20 is merely illustrative. If desired, adjustable load circuitry 114 may be formed at any location in device 10 that is coupled to the output of power amplifier circuitry 20. For example, adjustable load circuitry 114 may be formed as part of matching circuitry 32 in front-end circuitry 48.

The example of switching power amplifier circuitry 20 into a linear mode and a normal mode is merely illustrative. If desired, the power amplifier circuitry 20 may be operated in any number of modes in which the linearity of power amplifier circuitry 20 is optimized to satisfy adjacent band emissions requirements while minimizing power consumption. If desired, any combination of adjusting bias voltage, adjusting bias current, selecting a low or high linearity amplification path, bypassing a number of amplifier stages, or adjusting adjustable load circuitry may be performed in each of the operating modes.

Figure 7:
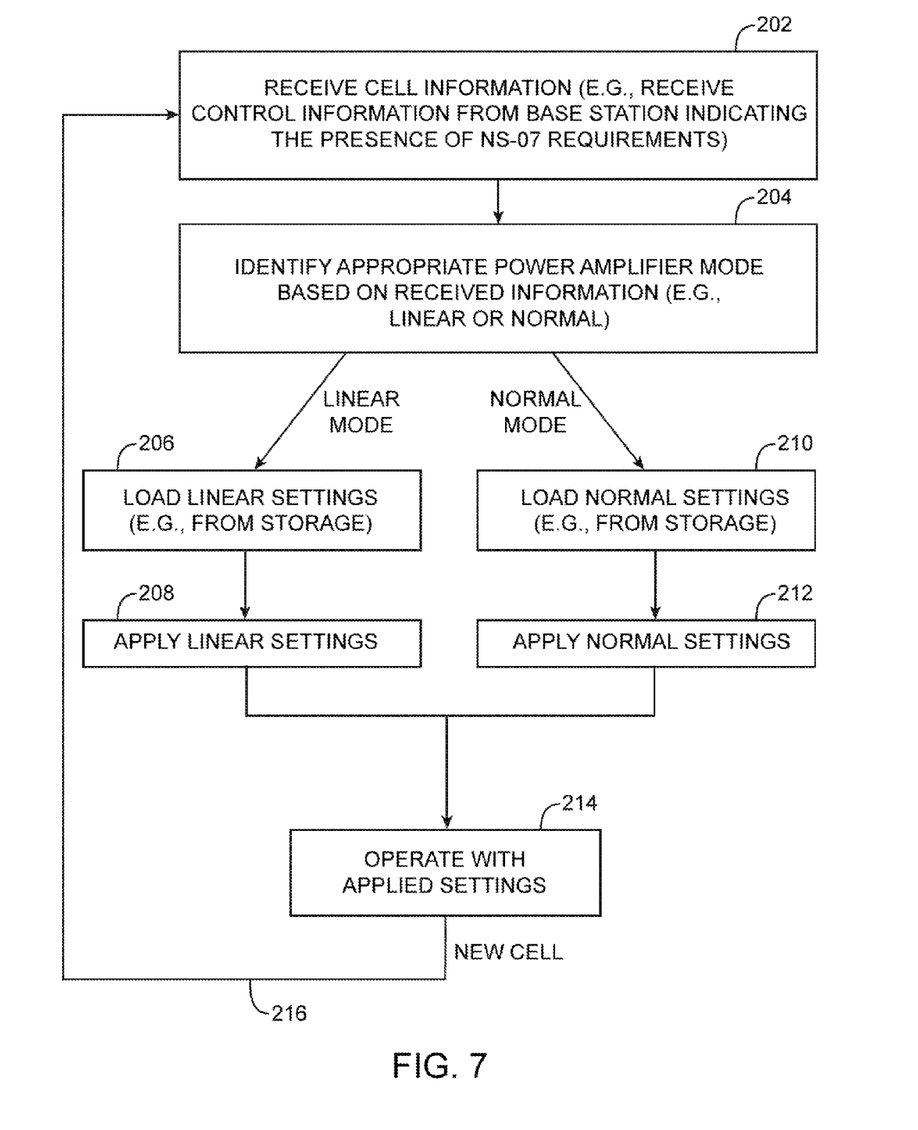
FIG. 7 is a flowchart of illustrative steps that may be performed by an electronic device to minimize power consumption while satisfying emissions requirements in accordance with an embodiment of the present invention.

FIG. 7 shows illustrative steps that may be performed by a wireless electronic device 10 with power amplifier circuitry 20 to minimize power consumption while ensuring that adjacent band emissions requirements are satisfied.

In step 202, device 10 may receive cell information from a base station such as base station 6. Device 10 may receive the cell information by communicating with the base station in a communications frequency band. The cell information may indicate whether device 10 is required to satisfy normal adjacent band emissions requirements or required to satisfy additional emissions requirements such as NS-07 requirements. For example, the cell information may indicate that device 10 is operating in a geographical region in which public safety radios are communicating in a public safety frequency band that is adjacent to the communications frequency band used by the device to communicate with the base station. In this scenario, device 10 may be required to satisfy NS-07 adjacent band emissions requirements.

In step 204, device 10 may identify an appropriate power amplifier mode based on the received cell information. For example, if the cell information indicates that device 10 must satisfy NS-07 requirements, device 10 may determine that power amplifier circuitry 20 should operate in a linear mode.

As another example, if the cell information indicates that device 10 is in a normal cell, device 10 may determine that power amplifier circuitry 20 should operate in a normal mode. If device 10 identifies that circuitry 20 should operate in a linear mode, the operations of step 206 may be performed. If device 10 identifies that circuitry 20 should operate in a normal mode, the operations of step 210 may be performed.

In step 206, device 10 may load settings for operating power amplifier circuitry 20 in a linear mode. For example, device 10 may load configuration settings from storage 16. The configuration settings may include settings for biasing circuitry 84, DC-DC converter circuitry 82, multiplexers 86A, 86B, 86C, switch 116, adjustable load circuitry 114, etc.

In step 208, device 10 may use the configuration settings loaded in step 206 to configure power amplifier 20 in a linear mode that minimizes power consumption while ensuring that wireless emissions produced by device 10 satisfy the additional emissions requirements identified in step 202 (e.g., NS-07 emissions requirements).

In step 210, device 10 may load settings for operating power amplifier circuitry 20 in a normal mode (e.g., from storage 16). The configuration settings may include settings for biasing circuitry 84, DC-DC converter circuitry 82, multiplexers 86A, 86B, 86C, switch 116, adjustable load circuitry 114, etc.

In step 212, device 10 may use the configuration settings loaded in step 210 to configure power amplifier 20 in a normal mode that minimizes power consumption while ensuring that wireless emissions produced by device 10 satisfy normal adjacent band emissions requirements (e.g., normal adjacent band emissions requirements).

In step 214, device 10 may operate with the applied settings (e.g., the settings applied in either step 208 or step 212). For example, device 10 may transmit data to the base station while operating power amplifier circuitry 20 using the linear settings applied in step 210 or the normal settings applied in step 212. Operations may then loop back to step 202 to continuously optimize the configuration of power amplifier circuitry 20 based on cell information received from a base station.

The example of device 10 receiving cell information from base station 6 is merely illustrative. If desired, storage circuitry 16 may be loaded with cell information. Storage and processing circuitry 16 may identify that device 10 is located in a cell 52 such as an NS-07 cell based on geographical data (e.g., such as Global Position System data received from antennas 34 that may be used to identify the geographical location of device 10).

The foregoing is merely illustrative of the principles of this invention and various modifications can be made by those skilled in the art without departing from the scope and spirit of the invention.

What is claimed is:

1. Circuitry on a wireless electronic device, comprising:
   radio-frequency transceiver circuitry configured to wirelessly transmit radio-frequency signals in a first frequency band;
   radio-frequency amplifier circuitry configured to amplify radio-frequency signals that are transmitted from the radio-frequency transceiver circuitry in the first frequency band; and
   storage and processing circuitry configured to adjust the radio-frequency amplifier circuitry in response to identifying that a public safety network is operating in a second frequency band that is adjacent to the first frequency band, the radio-frequency amplifier circuitry comprising:

first and second radio-frequency power amplifiers that amplify the radio-frequency signals transmitted by the radio-frequency transceiver;

a circuit that supplies an adjustable power supply voltage to the first and second radio-frequency power amplifiers; and multiplexer circuitry that is interposed between the circuit and the first and second radio-frequency power amplifiers and that has a control input, wherein the storage and processing circuitry is configured to adjust the radio-frequency amplifier circuitry by providing a control signal to the control input that directs the multiplexer circuitry to route the adjustable power supply voltage from the circuit to a selected one of the first and second radio-frequency amplifiers.

2. The circuitry defined in claim 1, wherein the radio-frequency amplifier circuitry is characterized by a linearity associated with a ratio between the amplified radio-frequency signals and the radio-frequency signals from the radio-frequency transceiver circuitry and wherein the storage and processing circuitry is configured to adjust the radio-frequency amplifier circuitry by adjusting the linearity of the radio-frequency amplifier circuitry.

3. The circuitry defined in claim 2 wherein the radio-frequency amplifier circuitry further comprises a biasing circuit configured to supply an adjustable bias current to the radio-frequency power amplifier and wherein the storage and processing circuitry is configured to adjust the linearity of the radio-frequency amplifier circuitry by adjusting the adjustable bias current.

4. The circuitry defined in claim 3 wherein the first radio-frequency power amplifier forms a first amplification path for the radio-frequency signals from the radio-frequency transceiver circuitry, the second radio-frequency power amplifier forms a second amplification path for the radio-frequency signals from the radio-frequency transceiver circuitry, and the storage and processing circuitry is configured to adjust the linearity of the radio-frequency amplifier circuitry by selecting between the first and second amplification paths.

5. The circuitry defined in claim 2 wherein the radio-frequency amplifier circuitry further comprises an adjustable load circuit coupled to the radio-frequency power amplifier and wherein the storage and processing circuitry is configured to adjust the linearity of the radio-frequency amplifier circuitry by adjusting the adjustable load circuit.

6. The circuitry defined in claim 2 wherein the first radio-frequency power amplifier comprises a plurality of power amplifier stages that amplify the radio-frequency signals from the radio-frequency transceiver and wherein the storage and processing circuitry is configured to adjust the linearity of the radio-frequency amplifier circuitry by selectively enabling each power amplifier stage of the plurality of power amplifier stages.

7. The circuitry defined in claim 1 wherein the radio-frequency transceiver circuitry is further configured to receive radio-frequency signals in the first frequency band from a base station and wherein the storage and processing circuitry is further configured to identify that the public safety network is operating in the second frequency band that is adjacent to the first frequency band based on radio-frequency signals received from the base station by the radio-frequency transceiver circuitry.

8. A method of operating an electronic device, comprising:

with radio-frequency transceiver circuitry, transmitting radio-frequency signals in a first frequency band;

with radio-frequency amplifier circuitry that is characterized by a linearity, amplifying the radio-frequency signals that are transmitted from the radio-frequency transceiver circuitry to produce amplified radio-frequency signals;

identifying whether a public safety network is present and operating in a second frequency band;

in response to identifying that the public safety network is present and operating, configuring the radio-frequency amplifier circuitry in a high linearity mode in which the radio-frequency power amplifier circuitry has a first linearity; and in response to identifying that the public safety network is not present and operating, configuring the radio-frequency power amplifier circuitry in a low linearity mode in which the radio-frequency power amplifier circuitry has a second linearity that is less than the first linearity, wherein the electronic device consumes more power in the high linearity mode than in the low linearity mode, configuring the radio-frequency amplifier circuitry in the high linearity mode comprises adjusting an adjustable load circuit coupled to an output of the radio-frequency amplifier circuitry to exhibit a first impedance, and configuring the radio-frequency amplifier circuitry in the low linearity mode comprises adjusting the adjustable load circuit to exhibit a second impedance that is greater than the first impedance.

9. The method defined in claim 8, wherein the linearity is associated with a ratio between the amplified radio-frequency signals and the radio-frequency signals that are wirelessly transmitted from the radio-frequency transceiver circuitry.

10. The method defined in claim 9 wherein configuring the radio-frequency amplifier circuitry in the high linearity mode comprises making an adjustment selected from the group consisting of: a bias current adjustment provided to the radio-frequency amplifier circuitry, a bias voltage adjustment provided to the radio-frequency amplifier circuitry, an adjustment selecting between first and second amplification paths within the radio-frequency amplifier circuitry, and an adjustment bypassing at least one amplification stage within the radio-frequency amplifier circuitry.

11. The method defined in claim 8 wherein identifying whether the public safety network is present and operating in the second frequency band comprises:

with the radio-frequency transceiver circuitry, receiving radio-frequency signals from a base station that indicate that the public safety network is present.

12. The method defined in claim 8 wherein the radio-frequency transceiver circuitry communicates with a base station associated with a geographical region and wherein identifying whether the public safety network is present and operating in the second frequency band comprises:

with the radio-frequency transceiver circuitry, receiving radio-frequency signals from the base station that indicate that the public safety network is present within the geographical region.

13. The method defined in claim 8 wherein identifying whether the public safety network is present and operating in the second frequency band comprises:

obtaining Global Positioning System data over an antenna in the electronic device;

identifying a geographical location of the electronic device based on the obtained Global Positioning System data; and identifying whether the public safety network is present and operating in the second frequency band at the identified geographical location of the electronic device.

14. A method of operating an electronic device, comprising:

with radio-frequency transceiver circuitry, communicating with a first wireless network in a first frequency band;

with radio-frequency power amplifier circuitry, amplifying radio-frequency signals that are wirelessly transmitted from the radio-frequency transceiver circuitry to produce amplified radio-frequency signals, the radio-frequency power amplifier circuitry comprising first and second radio-frequency power amplifiers and an adjustable power supply circuit that generates an adjustable power supply voltage;

receiving cell information from a wireless base station that is in communication with the electronic device, wherein the cell information indicates whether the electronic device is required to satisfy radio-frequency emissions requirements associated with a public safety network operating in a cell associated with the wireless base station;

identifying whether a second wireless network is present and operates in a second frequency band based on the received cell information; and in response to identifying that the second wireless network is present, adjusting the radio-frequency power amplifier circuitry by routing the adjustable power supply voltage from the adjustable power supply circuit to a selected one of the first and second radio-frequency power amplifiers.

15. The method defined in claim 14, wherein the radio-frequency power amplifier circuitry is characterized by a linearity associated with a ratio between the amplified radio-frequency signals and the radio-frequency signals that are wirelessly transmitted from the radio-frequency transceiver circuitry and wherein adjusting the radio-frequency power amplifier circuitry comprises adjusting the linearity of the radio-frequency power amplifier circuitry.

16. The method defined in claim 14 wherein identifying whether the second wireless network is present and operates in a second frequency band comprises:

identifying that the public safety network is present and operates in the second frequency band.

17. The method defined in claim 16 wherein the first frequency band comprises Long Term Evolution (LTE) band 13, wherein LTE band 13 is adjacent to the second frequency band, and wherein communicating with the first wireless network in LTE band 13 comprises communicating with the first wireless network in LTE band 13 that is adjacent to the second frequency band.

18. The method defined in claim 14 wherein the first frequency band is adjacent to the second frequency band and wherein communicating with the first wireless network in the first frequency band comprises communicating with the first wireless network in the first frequency band that is adjacent to the second frequency band.

* * * * *